No. 620,482. Patented Feb. 28, 1899.
W. L. MORO.
VEHICLE WHEEL.
(Application filed May 31, 1898.)
(No Model.) 2 Sheets—Sheet 1.
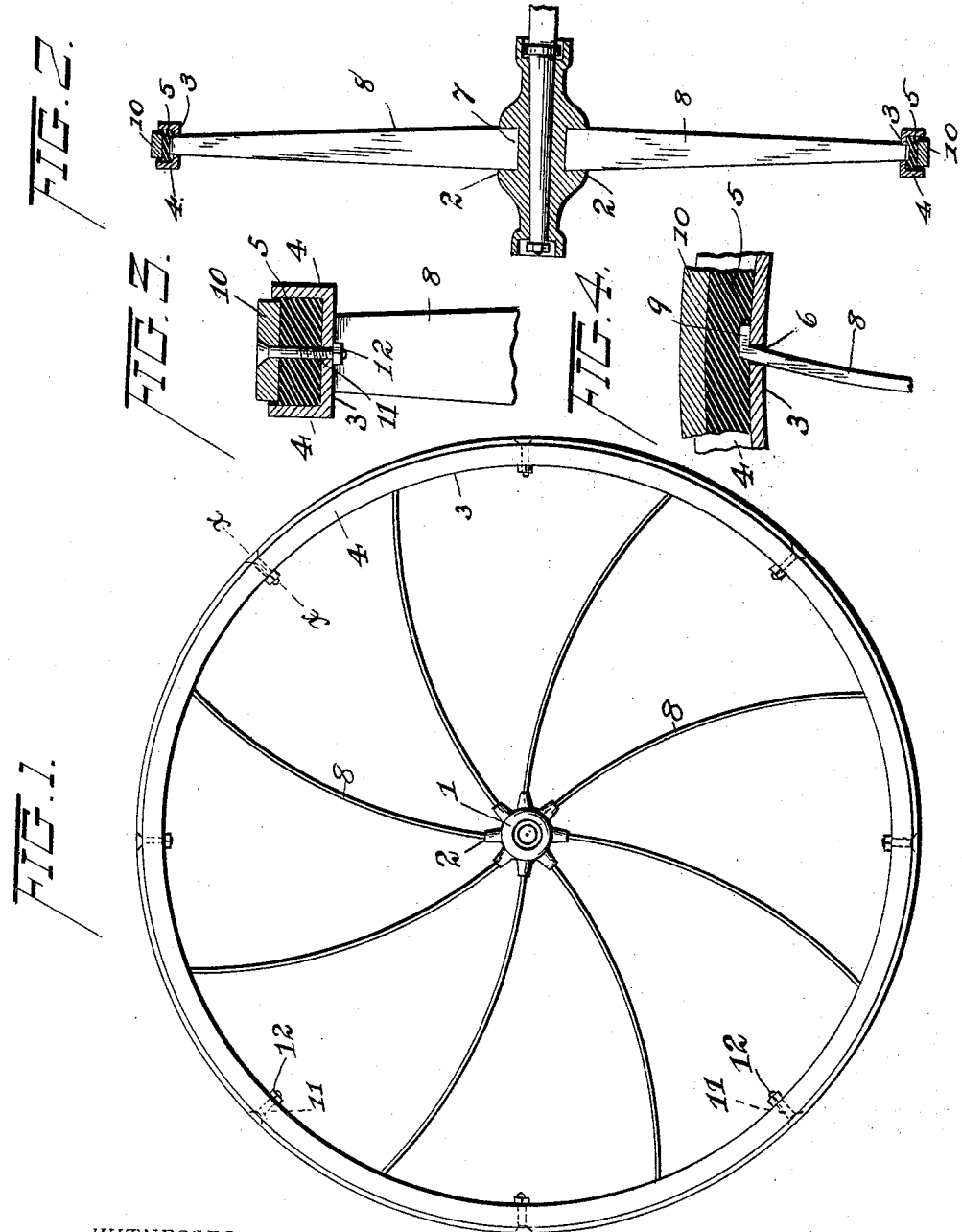
WITNESSES
Sam'l R. Turner
Chas. S. Hyer
INVENTOR
W. L. Moro.
By Ph. A. B. Lacey
Attorneys

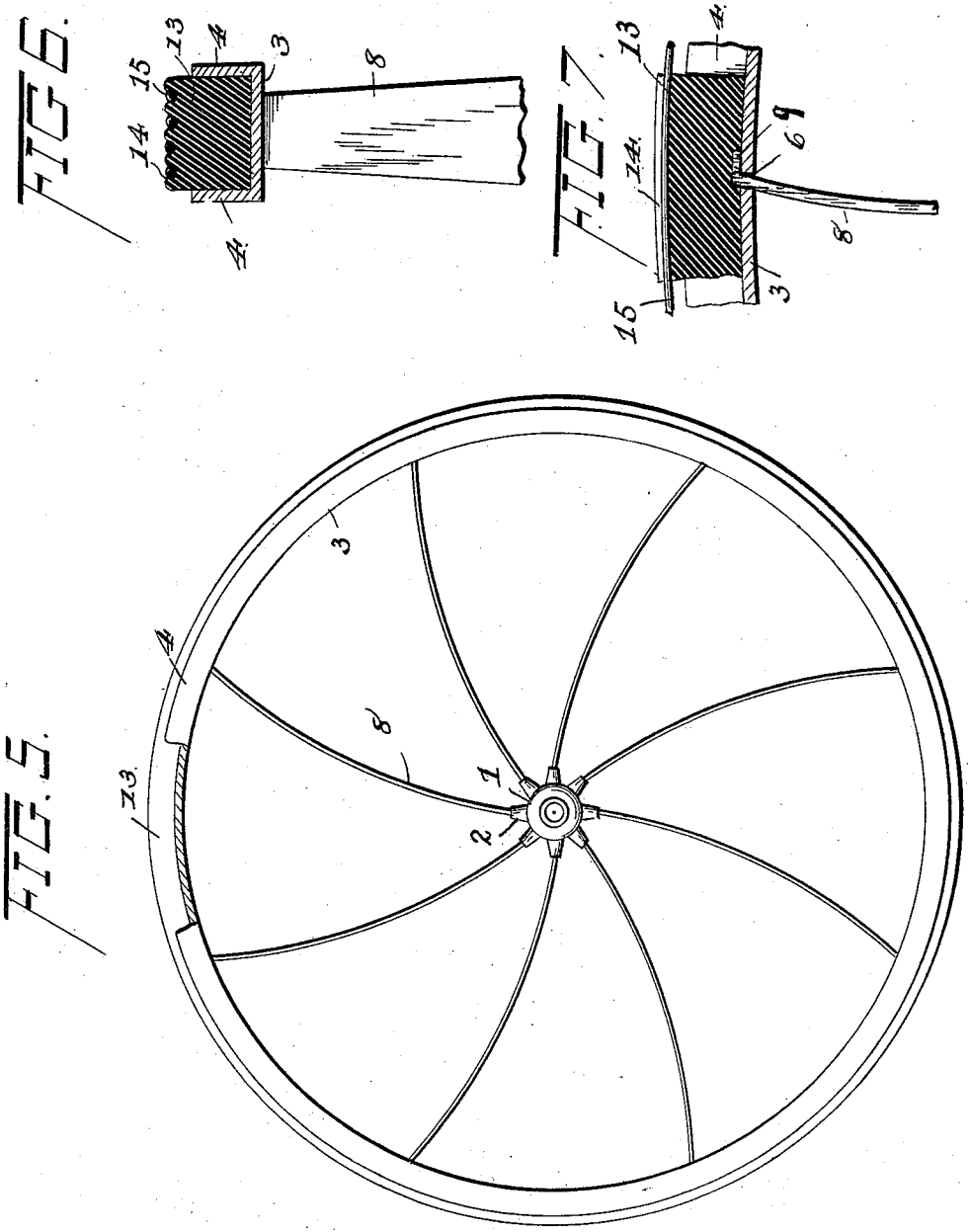

UNITED STATES PATENT OFFICE.

WILLIAM L. MORO, OF LOVE'S LAKE, LOUISIANA.

VEHICLE-WHEEL.

SPECIFICATION forming part of Letters Patent No. 620,482, dated February 28, 1899.

Application filed May 31, 1898. Serial No. 682,186. (No model.)

*To all whom it may concern:*

Be it known that I, WILLIAM L. MORO, a citizen of the United States, residing at Love's Lake, in the parish of Red River and State of Louisiana, have invented certain new and useful Improvements in Vehicle-Wheels; and I do hereby declare the following to be a full, clear, and exact description of the invention, such as will enable others skilled in the art to which it appertains to make and use the same.

This invention relates to wheels for use on road-vehicles generally, though particularly adapted to dirt roads; and it consists, essentially, of a hub having a series of radially-disposed sockets and a surrounding rim, with side flanges to form a seat, and provided with slots at regular intervals to receive the outer ends of tapered spring-spokes, having their inner ends snugly fitted in the sockets of the hub, combined with a cushion-tread secured in the rim.

The invention further consists of the details of construction and arrangement of the several parts, which will be hereinafter more fully described and claimed.

The object of the invention is to provide a wheel adapted to absorb the shock and irregularity of movement incident to usage on rough roads, so that an occupant of a vehicle will feel the shocks as little as possible, and the life of the vehicle will be prolonged by removing vibrations or jars therefrom.

In the accompanying drawings, Figure 1 is an elevation of a vehicle-wheel embodying the invention. Fig. 2 is a transverse vertical section of the same. Fig. 3 is a section on the line $x$ $x$, Fig. 1. Fig. 4 is a section through the rim of the wheel at the point where one of the spokes is secured thereto and taken in a longitudinal direction. Fig. 5 is an elevation of a wheel broken away and embodying a modification in the construction. Fig. 6 is a transverse vertical section through a portion of the rim of the wheel as shown by Fig. 5. Fig. 7 is a partial longitudinal section through the wheel.

Referring to the drawings, wherein similar numerals are employed to indicate corresponding parts in the several views, the numeral 1, Figs. 1 and 2, designates a hub, which is preferably formed of metal, and cast or otherwise attached thereto are a series of radially-disposed sockets 2. Surrounding the hub is a rim 3, which, as more clearly shown in Figs. 3 and 4, is provided with side flanges 4 to form a seat for a rubber, cork, or analogous cushion 5. The inner part or base of the rim 3 at regular intervals is formed with transverse slots 6, as clearly illustrated by Fig. 4, and snugly fitted in each of the sockets 2 is the inner broadened end 7 of a tapered spring-spoke 8, having its outer end passed through a properly-positioned slot 6 in the rim 3 and upset, as at 9, and secured by rivets or other means. The spokes 8 taper equally from the sockets 2 to the rim 3, and when secured in position they are slightly bowed, as shown by Fig. 1. After the hub and rim are resiliently connected to each other by the spokes 8 the rubber, cork, or analogous cushion 5 is mounted in said rim and thereon is placed a steel tread 10, which surrounds the entire wheel and stands out beyond the outer terminations of the flanges 4. The tread or tire 10, cushion 5, and rim 3 are secured to each other by small bolts or screw-rivets 11, which have their outer headed ends countersunk in the said band or tire and their inner ends are engaged by nuts 12, as clearly shown in Figs. 1 and 3. The inner broadened ends 7 of the spring-spokes 8 are forced into the sockets 2 and firmly held against movement, and in operation the wheel as thus far described absorbs all shocks or jars incident to irregularities and roughness of the roadway over which it moves through the intervention of the spring-spokes 8.

This device is not only beneficial to an occupant of a vehicle, but also prevents wear and tear on the vehicle itself, and in a great measure the numerous springs employed in the running-gear of a carriage or wagon will be reduced, as the resilient nature of the wheel set forth will replace the same with a more positive action.

It will be observed from the construction and arrangement of the several parts of the wheel that sand or dirt is prevented from congregating at any point therein, and particularly in the rim, the joint between the outer end of each spoke and the inner portion or bottom of the rim being virtually sealed by the cushion 5, and the slots 6 are just large enough to permit the said outer ends of the spokes to pass therethrough without leaving any space for the congregation of grit or other injurious particles.

In Figs. 5, 6, and 7 the construction of the hub 1, sockets 2, rim 3, and spring-spokes 8 is the same as in Figs. 1, 2, 3, and 4. The change of construction in this instance resides in dispensing with the outer band or tire 10 and replacing it by an extended cushion 13, which is preferably formed of rubber and provided with a series of circumferential grooves 14, in which are placed a series of binding-wires 15. The bolts 11 and nuts 12 are not used in this instance, as the wires 15 have sufficient tension applied thereto to firmly bind the cushion in the rim 3. This arrangement provides a very effective cushion-tread, and the grooves 14 not only serve the purpose of instituting seats for the binding-wires 15, but also prevent the engaging face of the cushion from slipping laterally. By the use of this extended cushion the general resiliency of the wheel is increased and the component parts of the entire wheel are consequently lessened and lightened.

Both forms of the wheel have similar advantages, and to suit various applications changes in the proportions, dimensions, and minor details of construction might be resorted to without departing from the nature or spirit of the invention or sacrificing any of the advantages thereof.

Having thus described the invention, what is claimed as new is—

1. A vehicle-wheel, comprising a hub having a series of radially-disposed sockets thereon, a rim with a series of slots in the inner portion thereof and supporting a cushion-tire, and a series of spring-spokes tapered toward their outer ends and having the inner broadened ends thereof snugly fitted in the sockets and the outer ends passed through the openings in the tire and upset and secured, said cushion-tire being directly on the outer upset ends of the spokes.

2. In a vehicle-wheel, the combination of a hub having a series of radially-disposed sockets thereon, a rim with side flanges and slots at regular intervals in the bottom or inner portion thereof, a series of tapered spring-spokes having their inner broadened ends snugly fitted in the sockets of the hubs and their outer ends passed through the slots in the rim and upset and secured, a cushion mounted in the said rim, and a surrounding tire or tread on the cushion and projecting outwardly from the flanges of the rim, the said band or tread, cushion and rim, being secured by bolts passing through the same.

In testimony whereof I affix my signature in presence of two witnesses.

WILLIAM L. MORO.

Witnesses:
   H. A. KINARD,
   T. E. PAGE.